United States Patent [19]

Randle

[11] Patent Number: 4,519,628
[45] Date of Patent: May 28, 1985

[54] VEHICLE SUSPENSIONS

[75] Inventor: James N. Randle, Coventry, England

[73] Assignee: Austin Rover Group Limited, England

[21] Appl. No.: 524,568

[22] Filed: Aug. 19, 1983

[30] Foreign Application Priority Data

Aug. 21, 1982 [GB] United Kingdom ............... 8224126

[51] Int. Cl.³ .............................................. B60G 3/00
[52] U.S. Cl. ..................................... 280/701; 280/690
[58] Field of Search ............... 280/690, 691, 696, 701, 280/673, 670, 660, 96.1, 724, 725

[56] References Cited

U.S. PATENT DOCUMENTS

| | | | |
|---|---|---|---|
| 2,845,134 | 7/1958 | Reimspiess | 280/701 |
| 2,968,357 | 1/1961 | Roller | 280/701 |
| 3,173,707 | 3/1965 | Peras | 280/701 |
| 3,895,728 | 7/1975 | Heggen | 214/140 |
| 4,055,262 | 10/1977 | Bauet et al. | 214/140 |
| 4,060,261 | 11/1977 | Bauer et al. | 280/756 |
| 4,334,698 | 6/1982 | Ruf | 280/690 |

FOREIGN PATENT DOCUMENTS 1530742 5/1969 Fed. Rep. of Germany ...... 280/701

OTHER PUBLICATIONS

Gehl Company, 3510/3610 Skid Steer Loaders, form #4175-681-30MW, West Bend Bend, Wisconsin 53095.

Primary Examiner—Joseph F. Peters, Jr.
Assistant Examiner—Ross Weaver
Attorney, Agent, or Firm—Thomas J. Greer, Jr.

[57] ABSTRACT

A road wheel suspension includes a wishbone 13 which may be for a rear driven wheel. Fore-and-aft compliance is introduced into the suspension without the usual problems of steering by mounting the wishbone on the body via a link 15 which can pivot about a transverse axis. In one embodiment, the inner ends of the front wishbone arms are mounted at the bottom of (plate-shaped) link 15, which is apertured to allow the prop-shaft to extend through, and the inner ends of the rear arms are resiliently secured to cross-member 21. The link is pivotally mounted on the final drive casing 14 about a transverse axis. The wishbones are stiff as far as lateral deflections are concerned but compliant for fore-and-aft deflections, the latter feature promoting increased ride comfort.

14 Claims, 4 Drawing Figures

VEHICLE SUSPENSIONS

This invention relates to vehicle suspensions.

It has long been recognised that from the point of view of the ride comfort of a vehicle suspension, it is desirable to permit the vehicle wheels to move fore-and-aft in relation to the vehicle body by means of compliance in the suspension arrangements. Difficulties have however been experienced in the past with achieving this while maintaining adequate lateral location of the wheels, and without the wheels adopting unwanted steering angles with respect to the vehicle center line.

The invention provides a suspension for a road wheel, which includes a wishbone, and a link which is pivotable about an axis transverse with respect to the vehicle body, the inner end of one arm of the wishbone being mounted on the pivotal link to provide fore-and-aft compliance in the wishbone and thus in the wheel.

Advantageously, the link is mounted on the vehicle body via a resilient bush whose axis lies in a fore-and-aft plane of the vehicle. The bush may be mounted directly on the vehicle body, but preferably it is mounted on the final drive casing, which is of course itself mounted on the vehicle body.

The inner end of the other arm of the wishbone is preferably connected to the vehicle body by resilient means, such as a resilient bush. The connection may either be direct, or indirect, for example, via the final drive casing. Together, the mounting of one inner end of the wishbone on the pivotal link and of the other end via resilient means gives a fore-and-aft movement of the wishbone at the required low compliance for samll deflections.

Advantageously, there is provided a wishbone for the wheel at the other side of the vehicle, and a corresponding wishbone arm is mounted on the same link to provide fore-and-aft compliance of the other wheel.

The invention will now be described in detail by way of example with reference to the accompanying drawings, in which.

Figure 1:
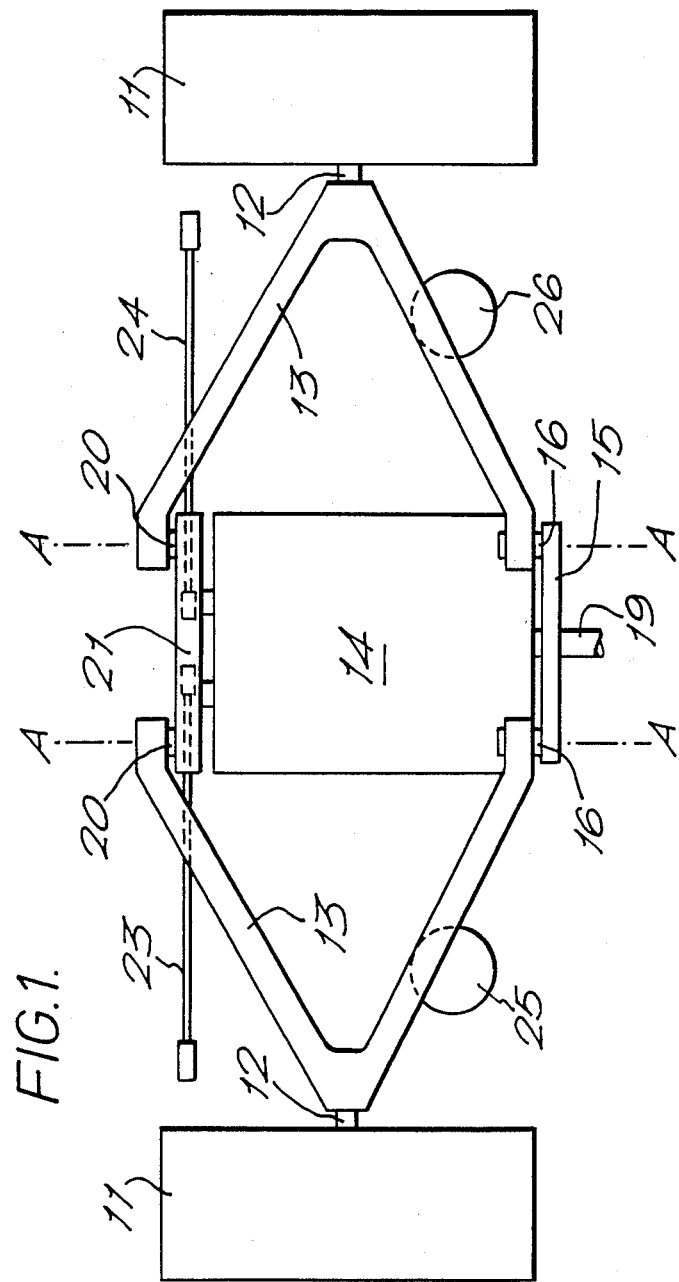
FIG. 1 is a schematic view from below of a rear suspension for a vehicle, in accordance with the invention.
Figure 2:
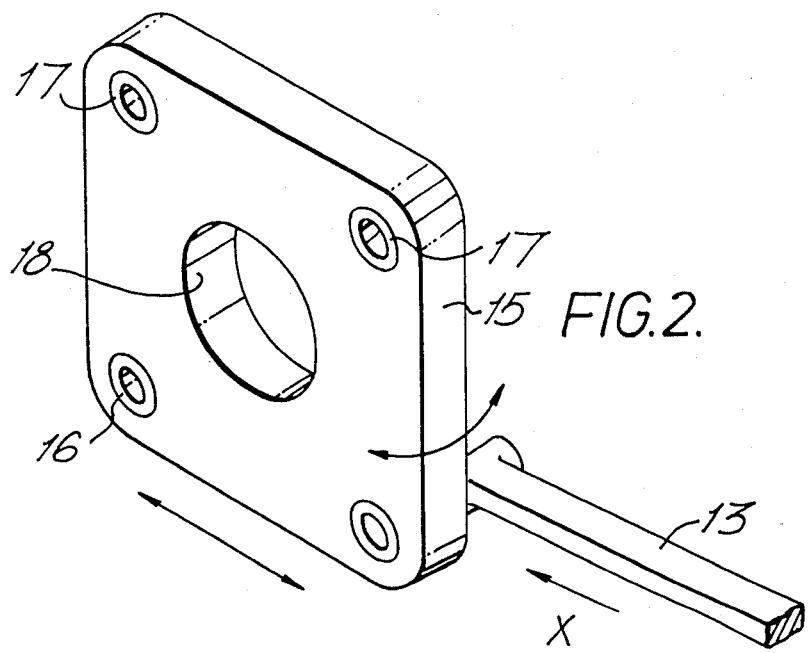
FIG. 2 is a perspective view of part of the suspension of FIG. 1.
Figure 3:
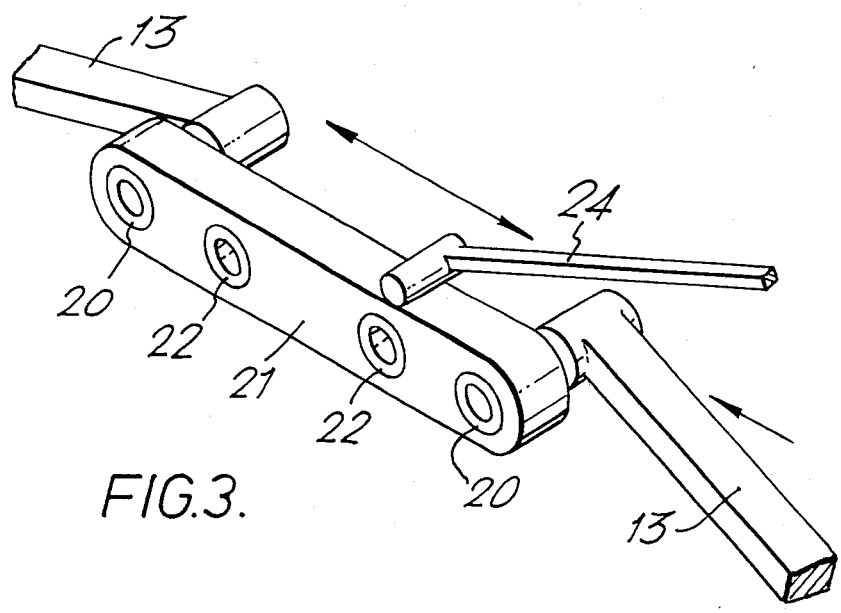
FIG. 3 is a perspective view of a further part of the suspension of FIG. 1.

FIG. 1 shows schematically a pair of rear wheels 11 for an automobile, which rotate on axles 12 carried by wishbones 13 which are pivotally mounted for movement about axes A—A extending longitudinally of the vehicle. Pivoting of the wheels about the axes A—A permit them to move vertically over irregularities in the terrian over which is vehicle is passing.

The inboard ends of the wishbones 13 are pivotally connected to a final drive casing 14 of the vehicle's transmission by way of an arrangement which permits the wishbones, and hence the wheels, to move fore or aft along paths parallel to the axes A—A. The wishbones 13 are connected to the vehicle structure at the forward end by means of a link in the form of a plate 15. Plate 15 is connected to the inboard ends of both wishbones through resilient bushes 16 and is in turn connected to the final drive casing 14 by way of resilient bushes 17 located above the bushes 16. An aperture 18 permits drive to be transferred to the final drive by a prop shaft 19. It will be appreciated that the plate will be reluctant to deflect under lateral loadings in the direction X, but will be relatively free to pivot and bend about the line joining the bushes 17, thus allowing the wishbone to move fore-and-aft.

The rear ends of the wishbones 13 are connected by way of resilient bushes 20 to a stiff cross member 21 which is in turn connected to the final drive casing 14 by way of resilient bushes 22 located inboard of the bushes 20. The cross-member 21 is located against transverse displacements by means of links 23, 24 connected to the vehicle body. The arrangement is such that longitudinal movements of the wheel and suspension arm encounter relatively low stiffness in the mounting, overcoming resistance in one bush 20 and one bush 22, while the mounting provides relatively greater stiffness to lateral inputs. Lateral inputs from both arms simultaneously do not involve the bushes 22 and thus compliance is confined to the bushes 20; a lateral input by one suspension arm only is resisted by bushes 20.

Thus the mounting arrangement permits relatively unrestrained fore-and-aft movement of the rear wheels within the limits imposed by the rear mounting, whilst lateral inputs result in small deflections of the wheels, particularly when they are applied equally and in opposite directions, such as during acceleration or braking. The plate 15 guides the movement of the wishbones while the bushes 20, 22 provide the stiffness required for the movement (in fact, low stiffness) and prevent movement of the plate beyond small deflections. Moreover, it will be seen that the fore-and-aft compliance of the wheel is achieved with effectively no more unwanted steering of the wheel taking place than in conventional mounting arrangements which do not provide for fore-and-aft movement of the wheel.

The suspension incorporates coil springs 25, 26 which act on the front arms of the wishbones: this results in a stable arrangement for the plate 15; on braking, the force on the front arms is downwards and hence the force on the plate is downwards; on acceleration, the upward force on the front arms is balanced by the load carried through the springs and the plate is stable also.

It would be possible to delete the rubber bushes 20 and replace them by solid bushes, since the bushes 20 allow sufficient fore-and-aft movement of the wishbones. It would also be possible to delete the links 23, 24, although in this case the bushes 20 would have to be of rubber. Once again, equal and opposite lateral deflections of the wishbone will not involve the bushes 22.

Figure 4:
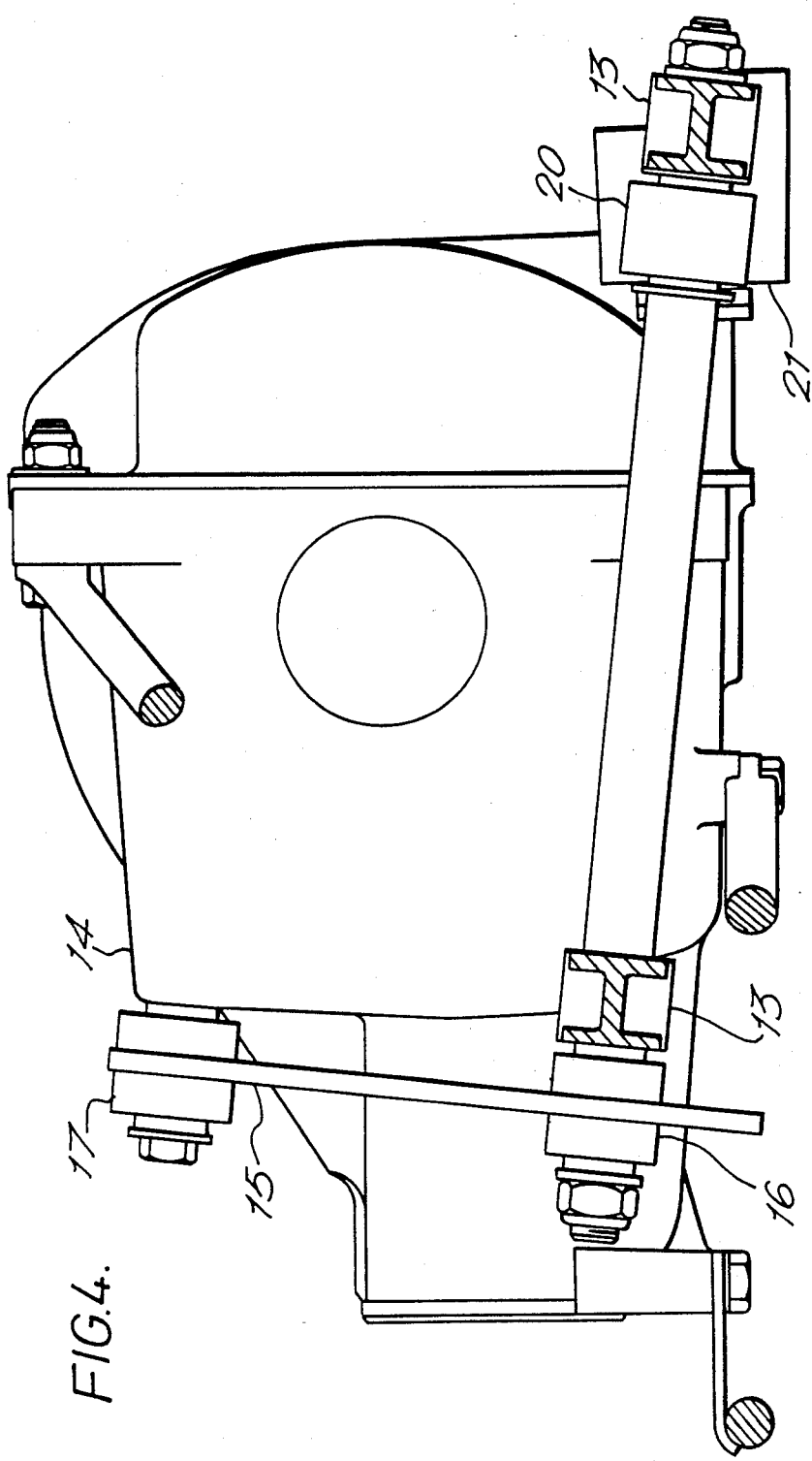
FIG. 4 is a section through a practical embodiment of the rear suspension of FIGS. 1 to 3. Like parts are given like reference numerals throughout the figures.

The illustrated suspension of FIG. 4 gives a fore-and-aft wheel deflection of $\pm \frac{3}{8}$ inch at a rate of less than 1000 lb/in.

It will be appreciated that various modifications to the illustrated embodiment are possible within the scope of the invention. For example it would be possible to incorporate two swinging plates, the further plate being incorporated in place of the member 21 to mount the rear arms of the wishbones. In such an arrangement it would be necessary to provide and end stop to prevent excessive force or aft rear wheel movement, and some means to provide the same stiffness as provided by the bushes 22.

Again the roles of the plate 15 and the member 21 could be reversed so that the plate carried the rear arm of the wishbone while the member 21 carried the front arm. All arrangements, however, benefit from the very low rate in the fore-and-aft direction of the swinging link mounting of at least one end of the wishbone, thus helping isolate the vehicle structure from even quite low frequencies of fore-and-aft vibrations of the wheel.

It is conceivable that the swinging plate could be pivotally mounted along its upper edge instead of being connected to the final drive casing through bushes 17. This would however increase the stresses in the plate during single wheel deflection, the illustrated arrangement permitting the plates to twist slightly at the top with all four bushes sharing the deflection.

Although the invention has been described in relation to a single wishbone rear suspension, it is also applicable to front suspensions, for example, double wishbone front suspensions.

I claim:

1. In a suspension for a road wheel of a vheicle:
a generally vertically extending link; 'a pivotal mounting for said link about an axis transverse of the vehicle whereby said link can move pivotally in a longitudinal direction but is constrained against lateral movement, said pivotal mounting including means for attachment to a vehicle body;
a wishbone;
a first inner mounting for said wishbone pivotally connecting said wishbone to said link at a position offset from said transverse axis;
a second inner mounting for said wishbone offset longitudinally from said first inner mounting and providing longitudinal compliance between said wishbone and said vehicle body;
a mounting for said road wheel on an outer end of said wishbone;
said first and second inner mountings providing a longitudinal pivot axis for said wishbone whereby said road wheel is guided for generally vertical suspension movements, said longitudinally spaced inner mountings resisting inadvertent steering effects of the suspension and the compliance associated with the said second inner mounting providing longitudinal compliance between said road wheel and a vehicle body.

2. A suspension according to claim 1 wherein said pivotal mounting of said link includes two resilient bushes mutually spaced transversely of the vehicle.

3. A suspension according to claim 2, wherein each of said bushes has an axis lies in a respective fore-and-aft plane of the vehicle.

4. A suspension according to claim 2, wherein said vehicle includes a final drive casing, and each bush is adapted to be connected to a vehicle body via said final drive casing.

5. A suspension according to claim 1 wherein said first inner mounting comprises a resilient bush interconnecting said wishbone and said link.

6. A suspension according to claim 1, wherein said wishbone is connected to said link below said transverse axis.

7. A suspension according to claim 1 wherein said first inner mounting for said wishbone lies forward of said second inner mounting.

8. A suspension according to claim 1 wherein said second inner mounting for said wishbone comprises a resilient bush having an axis extending longitudinally of the vehicle.

9. A suspension for two transversely spaced road wheels one to each side of a vehicle, each road wheel being mounted to said vehicle body in accordance with claim 1 wherein a common generally vertically extending link is providef for both of said first inner mountings of said two wishbones.

10. A suspension according to claim 9, wherein said vehicle includes a final drive casing, said suspension further includes a cross member, and wherein said second inner mountings for said wishbones mount said wishbones to said cross member which in turn is mounted to said final drive casing.

11. A suspension according to claim 10 together with resilient bushes mounting said common cross member to said final drive casing, and there are further links locating said cross member against lateral displacements.

12. A suspension according to claim 9, wherein said wheels are rear wheels of the vehicle.

13. A suspension for a road wheel of a vehicle, said suspension including a wishbone, and a link which is pivotable about an axis transverse with respect to a vehicle longitudinal axis, the inner end of one arm of the wishbone being mounted on the pivotal link to provide fore-and-aft compliance to the wishbone and thus in the wheel, a second like wishbone for a second road wheel at the other side of the vehicle, and a corresponding wishbone arm mounted on said link to provide fore-and-aft compliance of said second road wheel.

14. A suspension as claimed in claim 13, wherein the other wishbone arms are joined by a common link.

* * * * *